United States Patent [19]
Johnston et al.

[11] Patent Number: 5,252,168
[45] Date of Patent: Oct. 12, 1993

[54] PREPARING POLYMERIC MATRIX COMPOSITES USING AN AQUEOUS SLURRY TECHNIQUE

[75] Inventors: Norman J. Johnston, Newport News; Timothy W. Towell, Yorktown, both of Va.

[73] Assignee: The United States of America as represented by the Administrator of the National Aeronautics and Space Administration, Washington, D.C.

[21] Appl. No.: 788,403

[22] Filed: Nov. 6, 1991

[51] Int. Cl.$^5$ .................................................. C09J 5/02
[52] U.S. Cl. ............................. 156/307.4; 156/330.9; 428/367; 428/408; 524/538; 524/608
[58] Field of Search .............................. 524/538, 608; 156/330.9, 307.4; 428/367, 408

[56] References Cited

U.S. PATENT DOCUMENTS

| | | | |
|---|---|---|---|
| 4,169,866 | 10/1979 | von Bonin et al. | 524/538 |
| 4,442,248 | 4/1984 | Kanda et al. | 524/538 |
| 4,480,088 | 10/1984 | Pike | 524/600 |
| 4,601,945 | 7/1986 | Pike | 428/408 |

Primary Examiner—John J. Gallagher
Attorney, Agent, or Firm—George F. Helfrich

[57] ABSTRACT

An aqueous process was developed to prepare a consolidated composite laminate from an aqueous slurry. An aqueous poly(amic acid) surfactant solution was prepared by dissolving a poly(amic acid) powder in an aqueous ammonia solution. A polymeric powder was added to this solution to form a slurry. The slurry was deposited on carbon fiber to form a prepreg which was dried and stacked to form a composite laminate. The composite laminate was consolidated using pressure and was heated to form the polymeric matrix. The resulting composite laminate exhibited high fracture toughness and excellent consolidation.

11 Claims, No Drawings

PREPARING POLYMERIC MATRIX COMPOSITES USING AN AQUEOUS SLURRY TECHNIQUE

ORIGIN OF THE INVENTION

The invention described herein was made by employees of the United States Government and may be manufactured and used by or for the Government for governmental purposes without payment of any royalties thereon or therefor.

BACKGROUND OF THE INVENTION

1. Field of the Invention

This invention relates to composite materials. In particular, it relates to an aqueous process to prepare carbon fiber/polymer powder prepregs using an aqueous slurry technique.

2. Description of the Related Art

High temperature polymeric thermoplastic resins are attractive to the aerospace industry because of their excellent mechanical properties which are retained over a wide temperature range. The beneficial properties of such polymers as polyimides include strength, toughness and adhesion which makes them prime candidates as matrix resins in advanced carbon-fiber reinforced composites. However, preparing composites of these materials has been difficult due to their lack of melt flow and insolubility in standard solvents. Successful composite manufacture must be preceded by a pre-impregnation step in which the resin is intimately impregnated into the carbon fibers so as to require minimal melt flow to achieve composite consolidation.

Various techniques have been developed to combine thermoplastic resins and reinforcing fibers to form prepreg materials. In these techniques, polymer is deposited on the fiber from the melt state, from solution, or in powder form from a slurry or a fluidized bed. Many thermoplastic resins, such as polyimides, have poor melt flow and are insoluble in most solvents but may be prepared in powder form.

Dyksterhouse et al (U.S. Pat. No. 4,894,105) formed composites by dispersing polymer particles in an aqueous medium containing an effective amount of a dissolved polymeric binding agent. This binding agent is polyacrylic acid. The viscosity of the medium must be at least 50,000 cps to form a gelled impregnation bath wherein the polymer particles are uniformly suspended. This viscosity requirement is significantly higher than the present invention, where the viscosity is only 300 cps.

Pike (U.S. Pat. No. 4,480,088) teaches a process to prepare water soluble polyimide resin systems. This process involves the formation of the poly(amic acid) salt which may be converted to the polyimide by heating. There is no mention of the use of the poly(amic acid) salt as a surfactant for polymeric powders in an aqueous system.

Neither of the two previously mentioned inventions teaches the process for preparing a consolidated composite laminate using a poly(amic acid) salt as a surfactant. By the present invention, there is no need to increase the viscosity of the aqueous medium as was required in the related art. Also, the use of the poly(amic acid) as a surfactant allows for better compatibility throughout the final composite.

SUMMARY OF THE INVENTION

An aqueous process was developed for preparing uniform and processable consolidated composite laminates from polymers which are difficult to process. Examples of these polymers include polyimides, poly(aryleneethers), polysulfones, polybenzimidazoles, and liquid crystalline polymers. The process utilizes conventional solution prepregging techniques but does not require organic solvents, nor does it incorporate secondary polymers which are so chemically dissimilar to the primary polymer that there is incompatibility in the final product.

In the present invention, an aqueous poly(amic acid) surfactant solution was prepared by forming the base salt of the poly(amic acid). This was achieved by mixing a poly(amic acid) powder with an aqueous ammonia solution. The resulting solution had a viscosity of less than 300 cps. An aqueous slurry of 5–20% solids was formed from this solution by adding a polymeric powder. This slurry was deposited onto carbon fiber using standard wet prepregging techniques. The prepreg was dried at room temperature to remove excess water leaving the poly(amic acid) salt which binds the polymer to the fiber. The prepreg was then further dried in a forced air oven and partially imidized. The dried prepreg was stacked to form a composite laminate which was molded under heat and pressure. The application of heat and pressure imparts melt flow in the polymer and completes imidization of the poly(amic acid) salt forming a polymer blend. The resulting composite laminate exhibited high fracture toughness and excellent consolidation.

An object of the present invention is to develop an aqueous process for preparing consolidated composite laminates.

Another object of the present invention is to prepare a low viscosity aqueous poly(amic acid) surfactant solution.

Another object of the present invention is to prepare a slurry from the low viscosity poly(amic acid) surfactant solution and a polymeric powder.

DESCRIPTION OF THE PREFERRED EMBODIMENTS

In the formation of the aqueous poly(amic acid) surfactant solution, any poly(amic acid) precursor may be used so long as it may be rendered water soluble and converted to the polyimide by the application of heat. Ammonia is recommended as the solubilizing base because it may be readily removed in subsequent steps of composite fabrication. The concentration of poly(amic acid) in water should be as low as possible but high enough to effectively disperse the polymeric powder in the slurry and to bind the polymeric powder to the fiber in the dried prepreg. This concentration is around 3%. It was found that when the concentration was too high, resin melt flow was inhibited. However, at low concentrations, the polymeric powder could not be well-dispersed. Although increased viscosity will enhance the stability of the slurry, it was found that at a 3% poly(amic acid) salt concentration, a viscosity of 300 cps or less effectively suspended the polymeric powder.

The polymeric powder should be of a fine particle size to allow for easy dispersion. It is desirable that the median particle size be equal to or smaller than the diameter of the fibers to be impregnated. This promotes more uniform penetration. The concentration of the polymeric powder should be at a maximum but sufficient fluidity should be retained to impregnate the fibers. It was found that this concentration ranged from 5-20% solids.

The fibers may be impregnated with the aqueous slurry by passing fiber tows through a dip tank containing the slurry. The resulting prepreg material may be air-dried to remove excess water and allow for the poly(amic acid) salt to act as a binding agent between the polymer powder and the fiber. The use of a forced-air oven will remove not only any remaining water but will thermally imidize the poly(amic acid) salt, driving off the ammonia.

The prepreg can be stacked to form a composite laminate which is molded under heat and pressure. The application of heat and pressure imparts melt flow in the polymer and completes imidization of the poly(amic acid) salt resulting in a polymer blend. It was found that a pressure setting of 1000 psi resulted in complete consolidation of the laminate over greater than 90% of their areas. The composite laminates also exhibited high fracture toughness in addition to excellent consolidation.

The following examples are illustrative of the invention.

EXAMPLE I

Composites of LARC TM-TPI polyimide, commercially available from Mitsui Toatsu Chemicals, and Hercules AS-4 carbon fiber were prepared in the following manner. LARC TM-TPI 1500 pre-imidized powder (high flow grade) was obtained from Mitsui Toatsu Chemicals. The as-received powder had a median particle diameter of 23 μm. LARC TM-TPI poly(amide acid) (PAA) powder was also obtained from Mitsui Toatsu Chemicals. The PAA powder was received as a coarse powder and was ground finer to reduce the time required to dissolve it.

To formulate the LARC TM-TPI slurry, a basic solution was first prepared by adding 11.8 g of a 30% aqueous ammonia ($NH_3$) solution to 1588.2 g of water. Then, 49.5 g of PAA was added slowly with stirring in approximately 10 g increments until all of the PAA was dissolved. A 3% solids PAA solution was obtained. The ratio of $NH_3$ to organic acid groups was 1.125:1 (a slight excess of base) in order to promote the dissolution of PAA. The solution had a viscosity of less than 300 cps. Finally, 350.5 g of LARC TM-TPI 1500 pre-imidized powder was dispersed into the solution resulting in a stable slurry containing approximately 20% solids polymer with a 7.5:1 ratio of pre-imidized powder to PAA (based on the imide form of the PAA).

The polyimide slurry was deposited on un-sized 12k AS-4 carbon fiber using a standard drum winding technique. The carbon fiber tow was pulled through a dip tank containing a series of roller bars immersed in the slurry to enhance fiber spreading and wetting. Resin pickup was controlled using a die of fixed gap at the dip tank exit. The fiber was taken up on a drum that had a diameter of 61 cm. The resulting prepreg had a fiber areal weight of approximately 140 g/m². The prepreg was air-dried on the drum for several hours to remove a large portion of the water, then cut from the drum and dried in a forced-air oven at 204° C. (400° F.) for one hour to remove the remaining water and $NH_3$ from imidization.

Unidirectional composites were formed by stacking prepreg plies between Kapton ® film, available from DuPont, coated with a release agent in a matched-metal mold. The moldings were carried out in a heated hydraulic press. Panels were fabricated at molding pressures of 1000 psi. A series of temperature ramps and holds was used to prevent the PAA molecular weight from increasing too rapidly and hindering melt flow. The heating ramps were fixed at 5.6° C./min. The isothermal holds were as follows: 260° C. for 75 minutes, 288° C. for 45 minutes, 302° C. for 90 minutes, and finally 371° C. for 60 minutes.

Panels were ultrasonically scanned at a sensitivity level sufficient to detect microvoids in standard epoxy/graphite composites. All panels had C-scans showing complete consolidation over greater than 90% of their areas. Short beam shear properties were measure according to ASTM D234472 (4:1 span-to-depth ratio) and flexure properties according to ASTM D79066 (32:1 span-to-depth ratio). Mode I composite fracture toughness ($G_{IC}$) was obtained by the double cantilever beam (DCB) test on a unidirectional laminate with Kapton ® film placed at the mid-plane to control crack initiation. The DCB test specimen was one inch wide and six inches long with no taper. The mode I fracture energy was calculated using the compliance method.

Results from short beam shear and flexure tests are given in Table I. Overall values are typical for carbon fiber/organic matrix composites. Flexure moduli are somewhat lower than expected based on the modulus of the carbon fiber used. These lower values are believed to arise from fiber misalignment incurred during the molding process.

TABLE I

Short Beam Shear and Flexure Properties of AS-4/LARC TM-TPI 1500 (high flow grade)/PAA Composites

| Test Temperature, °C. (°F.) | SBS Strength, ksi | Flexural Strength, ksi | Flexural Modulus, Msi |
|---|---|---|---|
| Room Temperature | 13.6 | 228 | 11.3 |
| 93 (200) | 12.9 | 217 | 10.7 |
| 149 (300) | 9.9 | 211 | 12.1 |
| 177 (350) | 8.9 | 188 | 11.7 |

$G_{IC}$ fracture toughness was measured to be 7.1 in-lb/in² which is well in the range of what is considered to be a tough composite material. Initiation and propagation values were identical and no fiber bridging was observed indicating that the specimen was uniform and well consolidated.

EXAMPLE II

Composites of LARC TM-TPI polyimide and Hercules AS-4 carbon fiber were prepared in the following manner. LARC TM-TPI 1500 pre-imidized powder (medium flow grad) was obtained from Mitsui Toatsu Chemicals. The asreceived powder contained particle agglomerations and was ground to a median particle diameter of 16 μm. LARC TM-TPI poly(amic acid) (PAA) powder was received as a coarse powder and was ground finer to reduce the time required to dissolve it.

To formulate the LARC TM-TPI slurry, a basic solution was first prepared by adding 11.8 g of a 30% aqueous ammonia ($NH_3$) solution to 1588.2 g of water. Then, 49.5 g of PAA was added slowly with stirring in approximately 10 g increments until all of the PAA was dissolved. A 3% solids PAA solution was obtained. The ratio of $NH_3$ to organic acid groups was 1.125:1 (a slight excess of base) in order to promote the dissolution of PAA. The solution had a viscosity of less than 300 cps. Finally 350.5 g of LARC ™-TPI 1500 pre-imidized powder was dispersed into the solution resulting in a stable slurry containing approximately 20% solids polymer with a 7.5:1 ratio of pre-imidized powder to PAA (based on the imide form of the PAA). Also, 4.85 g of p-PDA/PA flow enhancing dopant was added to improve the melt-flow of the polyimide. p-PDA/PA was prepared by reacting phthalic anhydride (PA) with p-phenylene diamine (p-PDA) at a 2:1 molar ratio in a solvent mixture of diglyme and 1-methyl-2-pyrrolidinone.

The polyimide slurry was deposited on un-sized 12k AS-4 carbon fiber using a standard drum winding technique. The carbon fiber tow was pulled through a dip tank containing a series of roller bars immersed in the slurry to enhance fiber spreading and wetting. Resin pickup was controlled using a die of fixed gap at the dip tank exit. The fiber was taken up on a drum that had a diameter of 61 cm. The resulting prepreg had a fiber areal weight of approximately 140 g/m$^2$. The prepreg was air-dried on the drum for several hours to remove a large portion of the water, then cut from the drum and dried in a forced-air oven at 204° C. (400° F.) for one hour to remove the remaining water and NH$_3$ from imidization.

Unidirectional composites were formed by stacking prepreg plies between Kapton ® film coated with a release agent in a matched-metal mold. The moldings were carried out in a heated hydraulic press. Panels were fabricated at molding pressures of 1000 psi. A series of temperature ramps and holds was used to prevent the PAA molecular weight from increasing too rapidly and hindering melt flow. The heating ramps were fixed at 5.6° C./min. The isothermal holds were as follows: 260° C. for 75 minutes, 288° C. for 45 minutes, 302° C. for 90 minutes, and finally 371° C. for 60 minutes.

Panels were ultrasonically scanned at a sensitivity level sufficient to detect microvoids in standard epoxy-/graphite composites. All panels had C-scans showing complete consolidation over greater than 90% of their areas.

Results from short beam shear and flexure tests are given in Table II. Overall values are typical for carbon fiber/organic matrix composites. Flexure moduli are somewhat lower than expected based on the modulus of the carbon fiber used. These lower values are believed to arise from fiber misalignment incurred during the molding process.

TABLE II

Short Beam Shear and Flexure Properties of AS-4/ LARC ™-TPI 1500 (medium flow grade)/PAA Composites

| Test Temperature, °C. (°F.) | SBS Strength, ksi | Flexural Strength, ksi | Flexural Modulus, Msi |
|---|---|---|---|
| Room Temperature | 13.2 | 229 | 12.9 |
| 93 (200) | 11.9 | 228 | 12.5 |
| 149 (300) | 9.8 | 200 | 13.1 |
| 177 (350) | 8.5 | 178 | 11.4 |

G$_{IC}$ fracture toughness was measured for two specimens. Values of 8.6 and 8.8 in-lb/in$^2$ were obtained which are well in the range of what is considered to be a tough composite material. Initiation and propagation values were identical and no fiber bridging was observed indicating that the composites were uniform and well consolidated.

EXAMPLE III

A Composite of LARC ™-TPI polyimide and Hercules AS-4 carbon fiber was prepared in the following manner. LARC ™-TPI 1500 pre-imidized powder (medium flow grade) was obtained from Mitsui Toatsu Chemicals. The asreceived powder contained particle agglomerations and was ground to a median particle diameter of 16 μm. LARC ™-TPI poly(amic acid) (PAA) powder was received as a coarse powder and was ground finer to reduce the time required to dissolve it.

To formulate the LARC ™-TPI slurry, a basic solution was first prepared by adding 11.8 g of a 30% aqueous ammonia (NH$_3$) solution to 1588.2 g of water. Then, 49.5 g of PAA was added slowly with stirring in approximately 10 g increments until all of the PAA was dissolved. A 3% solids PAA solution was obtained. The ratio of NH$_3$ to organic acid groups was 1.125:1 (a slight excess of base) in order to promote the dissolution of PAA. The solution had a viscosity of less than 300 cps. Finally 350.5 g of LARC ™-TPI 1500 pre-imidized powder was dispersed into the solution resulting in a stable slurry containing approximately 20% solids polymer with a 7.5:1 ratio of pre-imidized powder to PAA (based on the imide form of the PAA). Also, 4.85 g of p-PDA/PA flow enhancing dopant was added to improve the melt-flow of the polyimide. p-PDA/PA was prepared as in Example II.

The polyimide slurry was deposited on un-sized 12k AS-4 carbon fiber using a standard drum winding technique. The carbon fiber tow was pulled through a dip tank containing a series of roller bars immersed in the slurry to enhance fiber spreading and wetting. Resin pickup was controlled using a die of fixed gap at the dip tank exit. The fiber was taken up on a drum that had a diameter of 61 cm. The resulting prepreg had a fiber areal weight of approximately 140 g/m$^2$. The prepreg was air-dried on the drum for several hours to remove a large portion of the water, then cut from the drum and dried in a forced-air oven at 204° C. (400° F.) for one hour to remove the remaining water and NH$_3$ from imidization.

A Unidirectional composite was formed by stacking prepreg plies between Kapton ® film coated with a release agent in a matched-metal mold. The moldings were carried out in a heated hydraulic press. Panels were fabricated at molding pressures of 300 psi. A series of temperature ramps and holds was used to prevent the PAA molecular weight from increasing too rapidly and hindering melt flow. The heating ramps were fixed at 5.6° C./min. The isothermal holds were as follows: 260° C. of 75 minutes, 288° C. for 45 minutes, 302° C. for 90 minutes, and finally 371° C. for 60 minutes.

The panel was ultrasonically scanned at a sensitivity level sufficient to detect microvoids in standard epoxy-/graphite composites. The panel had a C-scan showing complete consolidation over greater than 80% of its area.

EXAMPLE IV

A composite is prepared from a poly(arylene-ether) by the following method. A basic solution was first prepared by adding 11.8 g of a 30% aqueous ammonia (NH$_3$) solution to 1588.2 g of water. Then, 49.5 g of PAA was added slowly with stirring in approximately 10 g increments until all of the PAA was dissolved. A 3% solids PAA solution was obtained. The ratio of NH3 to organic acid groups was 1.125:1 (a slight excess of base) in order to promote the dissolution of PAA. The solution has a viscosity of less than 300 cps. Next, a poly(arylene-ether) powder such as poly(aryl-ether-ether-ketone) is dispersed into the solution resulting in a stable slurry.

The slurry is deposited on un-sized 12k AS-4 carbon fiber using a standard drum winding technique. The carbon fiber tow is pulled through a dip tank containing a series of roller bars immersed in the slurry to enhance fiber spreading and wetting. Resin pickup is controlled using a die of fixed gap at the dip tank exit. The fiber is taken up on a drum that has a diameter of 61 cm. The prepreg is air-dried on the drum for several hours to remove a large portion of the water, then cut from the drum and dried in a forced-air oven at 204° C. (400° F.) for one hour to remove the remaining water and NH3 from imidization.

Unidirectional composites are formed by stacking prepreg plies between Kapton ® film coated with a release agent in a matched-metal mold. The moldings are carried out in a heated hydraulic press and panels are fabricated under pressure.

EXAMPLE V

A composite is prepared from a polysulfone by the following method. A basic solution was first prepared by adding 11.8 g of a 30% aqueous ammonia (NH3) solution to 1588.2 g of water. Then, 49.5 g of PAA was added slowly with stirring in approximately 10 g increments until all of the PAA was dissolved. A 3% solids PAA solution was obtained. The ratio of NH3 to organic acid groups was 1.125:1 (a slight excess of base) in order to promote the dissolution of PAA. The solution had a viscosity of less than 300 cps. Next, a polysulfone powder such as poly(phenylene-sulfide) is dispersed into the solution resulting in a stable slurry.

The slurry is deposited on un-sized 12k AS-4 carbon fiber using a standard drum winding technique. The carbon fiber tow is pulled through a dip tank containing a series of roller bars immersed in the slurry to enhance fiber spreading and wetting. Resin pickup is controlled using a die of fixed gap at the dip tank exit. The fiber is taken up on a drum that has a diameter of 61 cm. The prepreg is air-dried on the drum for several hours to remove a large portion of the water, then cut from the drum and dried in a forced-air oven at 204° C. (400° F.) for one hour to remove the remaining water and NH3 from imidization.

Unidirectional composites are formed by stacking prepreg plies between Kapton ® film coated with a release agent in a matched-metal mold. The moldings are carried out in a heated hydraulic press and panels are fabricated under pressure.

EXAMPLE VI

A composite is prepared from a polybenzimidazole by the following method. A basic solution was first prepared by adding 11.8 g of a 30% aqueous ammonia (NH3) solution to 1588.2 g of water. Then, 49.5 g of PAA was added slowly with stirring in approximately 10 g increments until all of the PAA was dissolved. A 3% solids PAA solution was obtained. The ratio of NH3 to organic acid groups was 1.125:1 (a slight excess of base) in order to promote the dissolution of PAA. The solution had a viscosity of less than 300 cps. Next, a polybenzimidazole powder is dispersed into the solution resulting in a stable slurry.

The slurry is deposited on un-sized 12k AS-4 carbon fiber using a standard drum winding technique. The carbon fiber tow is pulled through a dip tank containing a series of roller bars immersed in the slurry to enhance fiber spreading and wetting. Resin pickup is controlled using a die of fixed gap at the dip tank exit. The fiber is taken up on a drum that has a diameter of 61 cm. The prepreg is air-dried on the drum for several hours to remove a large portion of the water, then cut from the drum and dried in a forced-air oven at 204° C. (400° F.) for one hour to remove the remaining water and NH3 from imidization.

Unidirectional composites are formed by stacking prepreg plies between Kapton ® film coated with a release agent in a matched-metal mold. The moldings are carried out in a heated hydraulic press and panels are fabricated under pressure.

EXAMPLE VII

A composite is prepared from a liquid-crystalline polymer by the following method. A basic solution was first prepared by adding 11.8 g of a 30% aqueous ammonia (NH3) solution to 1588.2 g of water. Then, 49.5 g of PAA was added slowly with stirring in approximately 10 g increments until all of the PAA was dissolved. A 3% solids PAA solution was obtained. The ratio of NH3 to organic acid groups was 1.125:1 (a slight excess of base) in order to promote the dissolution of PAA. The solution had a viscosity of less than 300 cps. Next, a liquid-crystalline polymer powder such as polybenzoxazole is dispersed into the solution resulting in a stable slurry.

The slurry is deposited on un-sized 12k AS-4 carbon fiber using a standard drum winding technique. The carbon fiber tow is pulled through a dip tank containing a series of roller bars immersed in the slurry to enhance fiber spreading and wetting. Resin pickup is controlled using a die of fixed gap at the dip tank exit. The fiber is taken up on a drum that has a diameter of 61 cm. The prepreg is air-dried on the drum for several hours to remove a large portion of the water, then cut from the drum and dried in a forced-air oven at 204° C. (400° F.) for one hour to remove the remaining water and NH3 from imidization.

Unidirectional composites are formed by stacking prepreg plies between Kapton ® film coated with a release agent in a matched-metal mold. The moldings are carried out in a heated hydraulic press and panels are fabricated under pressure.

We claim:

1. An aqueous process for preparing a consolidated composite laminate comprising:
   (a) preparing an aqueous poly(amic acid) surfactant solution comprised of a poly(amic acid) powder and an aqueous ammonia solution;
   (b) forming an aqueous slurry comprised of the poly(amic acid) surfactant solution and a polymeric powder;
   (c) depositing the aqueous slurry on carbon fiber to form a prepreg;
   (d) drying the prepreg;
   (e) stacking the prepreg to form a composite laminate; and
   (f) consolidating the composite laminate at pressures from about 300–1000 psi and heating at a temperature to imidize the poly(amic acid) and to impart melt flow in the polymeric powder.

2. The process of claim 1, wherein said poly(amic acid) surfactant solution is about 3% solids poly(amic acid).

3. The process of claim 1, wherein said aqueous slurry is about 5-20% solids polymeric powder.

4. The process of claim 1, wherein said polymeric powder is selected from the group consisting of: polyimide, poly(arylene-ether), polysulfone, polybenzimidazole, and liquid-crystalline polymers.

5. The process of claim 4, wherein said polymeric powder is a polyimide.

6. The process of claim 1, wherein said aqueous slurry is deposited on the carbon fiber by dipping.

7. The process of claim 1, wherein said prepreg is dried at room temperature.

8. The process of claim 1, wherein said prepreg is dried in a forced-air oven.

9. The process of claim 1, wherein said pressure is 1000 psi.

10. The process of claim 1, wherein said poly(amic acid) surfactant solution imidizes and forms a blend with the polymeric powder.

11. The process of claim 1, wherein said poly(amic acid) solution binds the polymeric powder to the carbon fiber.

* * * * *